US010815626B2

(12) United States Patent
Berning et al.

(10) Patent No.: US 10,815,626 B2
(45) Date of Patent: Oct. 27, 2020

(54) EARTH WORKING MACHINE HAVING A MAINTENANCE DOOR OFFERING STORAGE SPACE

(71) Applicant: Wirtgen GmbH, Windhagen (DE)

(72) Inventors: Christian Berning, Zülpich (DE);
Tobias Stinner, Weyerbusch (DE);
Hardy Wilhelmi, Dattenberg (DE);
Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 101 days.

(21) Appl. No.: 16/243,326

(22) Filed: Jan. 9, 2019

(65) Prior Publication Data

US 2019/0248422 A1 Aug. 15, 2019

(30) Foreign Application Priority Data

Feb. 9, 2018 (DE) .................. 10 2018 202 077

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *B62D 25/082* (2013.01);
(Continued)

(58) Field of Classification Search
CPC ....... B60J 5/0491; E02F 3/968; E02F 9/0833; E02F 9/0891; B60N 2/3045; B60N 2/38;
(Continued)

(56) References Cited

U.S. PATENT DOCUMENTS 1,213,848 A * 1/1917 Edgington ......... B62D 55/0845
180/69.1
2,931,453 A * 4/1960 Ingless ................ F01M 11/04
180/69.1
(Continued)

FOREIGN PATENT DOCUMENTS

DE 102013009031 A1 * 12/2014 ........... E01C 23/088
DE 102013009031 A1 12/2014
(Continued)

OTHER PUBLICATIONS

European Search Report in corresponding EP 19 15 0565, dated Jul. 2, 2019, 9 pages. (not prior art).

*Primary Examiner* — David J Bagnell
*Assistant Examiner* — Michael A Goodwin
(74) *Attorney, Agent, or Firm* — Lucian Wayne Beavers; Patterson Intellectual Property Law, PC

(57) ABSTRACT

An earth working machine (10), for example a road milling machine (10), recycler, stabilizer, or surface miner, having a propelling unit (22) and a machine frame (12) carried by the propelling unit (22), comprises a working apparatus (32) for earth working. Provision is made that the earth working machine (10) comprises, on an underside (12*a*) of the machine frame (12) facing toward the supporting substrate of the machine (10), a maintenance door (52) that is movable between a raised operational readiness position and a lowered maintenance position and that comprises, on its inner side (52*a*) that faces away from the supporting substrate (U) in the operational readiness position, at least one functional configuration (56, 58) that assists a maintenance operation.

11 Claims, 3 Drawing Sheets

(51) Int. Cl.
*E02F 9/08* (2006.01)
*B62D 25/08* (2006.01)
*B62D 25/12* (2006.01)
*E21C 25/10* (2006.01)
*E21C 35/00* (2006.01)

(52) U.S. Cl.
CPC ............ *B62D 25/12* (2013.01); *E02F 9/0833* (2013.01); *E02F 9/0891* (2013.01); *E21C 25/10* (2013.01); *E21C 35/00* (2013.01)

(58) Field of Classification Search
CPC ..... E01C 23/088; E01C 23/127; B60R 11/06; B62D 25/10
USPC ................................ 180/89.17; 296/37.1, 69
See application file for complete search history.

(56) References Cited

U.S. PATENT DOCUMENTS

| | | | | |
|---|---|---|---|---|
| 3,670,835 | A * | 6/1972 | Ross | B62D 55/0845 180/69.1 |
| 3,826,327 | A * | 7/1974 | Stover | B62D 25/2054 180/69.1 |
| 4,193,468 | A * | 3/1980 | Riddle | B60S 5/00 180/69.1 |
| 7,644,994 | B2 | 1/2010 | Busley et al. | |
| 7,901,010 | B2 | 3/2011 | Busley et al. | |
| 7,922,255 | B2 | 4/2011 | Busley et al. | |
| 8,167,378 | B2 | 5/2012 | Busley et al. | |
| 8,480,181 | B2 | 7/2013 | Busley et al. | |
| 8,807,662 | B2 | 8/2014 | Busley et al. | |
| 9,512,576 | B2 | 12/2016 | Busley et al. | |
| 9,624,628 | B2 | 4/2017 | Busley et al. | |
| 2010/0289297 | A1 | 11/2010 | Reeb | |
| 2014/0332292 | A1 * | 11/2014 | Gopalsamy | E02F 9/24 180/9.42 |
| 2015/0159344 | A1 | 6/2015 | Gopalsamy et al. | |
| 2016/0001818 | A1 | 1/2016 | Thelen et al. | |
| 2016/0326718 | A1 | 11/2016 | Capraro et al. | |
| 2018/0058019 | A1 | 3/2018 | Busley et al. | |

FOREIGN PATENT DOCUMENTS

| | | |
|---|---|---|
| DE | 102015007562 A1 | 12/2015 |
| EP | 1167626 A1 | 1/2002 |
| EP | 3091128 A1 | 11/2016 |
| JP | 2002013161 A | 1/2002 |

* cited by examiner

EARTH WORKING MACHINE HAVING A MAINTENANCE DOOR OFFERING STORAGE SPACE

BACKGROUND OF THE INVENTION

1. Field of the Invention

The present invention relates to an earth working machine, for example a road milling machine, recycler, stabilizer, or surface miner, having a propelling unit and a machine frame carried by the propelling unit, the earth working machine comprising a working apparatus for earth working.

2. Description of the Prior Art

A known earth working machine according to the present invention is, for example, a large road milling machine having the designation "W 210i". This is a so-called "cold milling machine" whose working apparatus, in the form of a rotating milling drum fitted with milling bits on its outer circumference, removes a substrate located below it from the surface down, with no prior heating of the substrate. As is usual with a large milling machine, the milling drum is located approximately at the longitudinal center between a front and a rear partial propelling unit of the earth working machine.

Earth working machines must not exceed predetermined external dimensions so that they can be moved, on lowboy trailers or similar transport means, on public roads without special authorization. The space available on an earth working machine is therefore limited and not expandable.

SUMMARY OF THE INVENTION

The object of the present invention is therefore to refine the earth working machine recited previously in such a way that the space occupied by it is usable as efficiently as possible for operation and/or maintenance of the earth working machine.

According to the present invention this object is achieved by an earth working machine of the kind recited previously that comprises, on an underside of the machine frame facing toward the supporting substrate of the machine, a maintenance door that is movable between a raised operational readiness position and a lowered maintenance position and that comprises, on its inner side that faces away from the supporting substrate in the operational readiness position, at least one functional configuration that assists a maintenance operation.

Thus not only can the maintenance door offer, on the underside of the machine frame, access from below into the space delimited by the machine frame, but the maintenance door itself can furthermore comprise a functional configuration that assists a maintenance operation. The maintenance operation that is assisted or assistable by the functional configuration is preferably a maintenance operation that is specifically not performed on an accessory that is reachable only by lowering the maintenance door. The functional configuration of the maintenance door preferably assists a maintenance operation on the working apparatus of the machine.

Concretely, the functional configuration can encompass a maintenance seat for a technician assigned to carry out the maintenance operation, and/or a storage compartment for receiving tools and/or equipment for the working apparatus.

The tools provided on earth working machines for earth working are subjected to more or less severe wear depending on the ground being worked, and therefore need to be replaced at certain intervals. In the preferred case of a road milling machine constituting an earth working machine, having a milling drum as the working apparatus, those tools for earth working are milling bits that are received replaceably in quick-change bit holders on the outer side of the milling drum. The maintenance door can thus comprise one or several storage compartments for so-called "bit boxes," i.e. for containers in which a milling bit or a plurality of milling bits, constituting replacements for milling bits already arranged on a milling drum, can be received and furnished in transportable fashion.

If the maintenance door comprises as a functional configuration the aforementioned maintenance seat, on which a technician (who can also be the machine operator) can sit for a maintenance operation such as replacing milling bits, that maintenance seat can in principle be connected rigidly to the maintenance door. In some circumstances, however, this can mean that the maintenance seat projects undesirably into the interior of the machine frame when the maintenance door is in the raised operational readiness position; in some circumstances, space in the interior of the machine frame must be created for this in terms of design. It is therefore preferred that the maintenance seat be displaceable between a non-use position and a use position. For example, when the maintenance door is lowered into its maintenance position, the maintenance seat can be pivotable around a seat pivot axis from its non-use position into its use position. The maintenance seat is therefore not disruptive even in the non-use position when the maintenance door is conveyed into its operational readiness position.

In principle, the maintenance door can be movable in any way between the raised operational readiness position and the lowered maintenance position. Preferably the maintenance door is pivotable around a door pivot axis between the aforesaid positions. This means that in the maintenance position, oppositely located end regions of the maintenance door approach the supporting substrate to within different distances. That end which comes closer to the supporting substrate in the maintenance position, referred to hereinafter as an "abutment end region," can be embodied to rest on a portion of the propelling unit, or to be in abutting engagement with it, in the maintenance position. A rolling surface of a drive unit that rolls on the supporting substrate is particularly suitable for such an abutting engagement. A drive unit of this kind can be a crawler track unit or a wheel drive unit.

The machine frame is usually vertically adjustable relative to the propelling unit, i.e. the height of the machine frame above the supporting substrate on which the machine is standing can be modified by a relative motion of the propelling unit relative to the machine frame. It can then be the case that the abutment end region comes into abutting engagement with the portion of the propelling unit only if the machine frame has previously been displaced into a predetermined distance range with respect to the supporting substrate.

In order to allow the largest possible abutment area to be achieved between the abutment end region and the portion of the propelling unit, the abutment end region can be bent. The abutment end region can thus comprise, for example, two surface regions, in particular flat surface regions, bent relative to one another, each of which can come into abutment against a different portion of the propelling unit when the machine frame has been displaced into a predetermined distance range above the supporting substrate. A bend axis around which two adjacent surface regions of the maintenance door are bent relative to one another is preferably parallel to the door pivot axis of the maintenance door and/or to the pitch axis of the machine. This applies preferably to each bend axis if the maintenance door comprises several surface regions bent with reference to one another.

It is also possible, however, for only one of two surface regions, bent with respect to one another, of the abutment end region to come into abutting engagement with the portion of the propelling unit, for example that surface region which is located farther from the longitudinal end of the abutment end region. That surface region which is bent relative thereto, and is located closer to the longitudinal end of the abutment end region, can then serve as a shield with respect to the propelling unit for a technician or machine operator working in the vicinity of the maintenance door. Specifically with the robust crawler track units that are often used, gaps into which objects can fall during maintenance work can exist between successive track links, and those objects must be retrieved before the machine can resume operation after maintenance. The above-described shielding of the propelling unit portion by a surface region of the abutment end region then serves to avoid unnecessary machine down time.

Purely in principle, the maintenance door can be merely a movable part in the external region of the machine frame. Preferably, however, it serves not only as a storage space and/or as a carrier of a maintenance seat, but also serves to selectably open up or close off a maintenance opening on the machine frame. The machine frame therefore preferably comprises on its underside a maintenance opening that enables access to a functional subassembly of the earth working machine, the maintenance door closing off the maintenance opening in its operational readiness position and opening it up in its maintenance position. The functional subassembly is preferably an internal combustion engine of the earth working machine, which as a rule is a central source of energy and power for the earth working machine. The internal combustion engine is then reachable not only by raising an engine hood as is usual, but also from below through the maintenance opening.

The propelling unit preferably comprises a front partial propelling unit located closer to the front end of the machine, for example encompassing two drive units that are parallel when traveling straight ahead, and a rear partial propelling unit located closer to the rear end of the machine, the latter once again preferably encompassing two drive units that are parallel when traveling straight ahead, the working apparatus being arranged along the roll axis of the machine between the front and the rear partial propelling unit. Such an arrangement is known, for example, from so-called "large" road milling machines. The maintenance door is then preferably arranged between one of the partial propelling units and the working apparatus, so that the at least one functional configuration provided on the maintenance door can assist maintenance of the working apparatus. "Maintenance" here is equivalent to a repair of the working apparatus. But whereas a "repair" is an unforeseeable event, maintenance work usually needs to be performed on the basis of defined events such as the fact that a predetermined number of operating hours have elapsed and/or that a predetermined earth working distance has been traveled, and can thus be scheduled.

Because the combustion engine that is preferably accessible through the maintenance opening is usually located closer to the rear of the earth working machine than to its front, the maintenance door is preferably located between the rear partial propelling unit and the working apparatus. Maintenance of the working apparatus for milling of the ground is also usually accomplished from the rear side, since the transport belt for transporting milling material away is located at the front.

Specifically when the maintenance door comprises one or several storage compartments for receiving the aforementioned bit boxes, the weight of the maintenance door can be considerable. To assist its movement between an operational readiness position and a maintenance position, it is therefore preferred if the earth working machine comprises an actuator that is arranged between the machine frame and the maintenance door in such a way that as a result of actuation thereof, the maintenance door is drivable to move between its positions (operational readiness position and maintenance position). Moving the maintenance door then does not require, or at least does not require only, muscle power.

As has already been indicated above, the maintenance door can be pivotable around a door pivot axis between its positions (operational readiness position and maintenance position). The door pivot axis can be variable in position, for example if the maintenance door is coupled movably to the remainder of the machine frame via a four-joint linkage. This can be kinematically advantageous in terms of pivoting the maintenance door in collision-free fashion from the operational readiness position into the maintenance position. A translational motion component then occurs in addition to the pivoting motion. Four-joint linkages are, however, complex. In the interest of a conformation that is maximally simple and minimally failure-prone, the maintenance door is therefore preferably only pivotable between its aforesaid positions. Regardless of whether the maintenance door is movable only pivotably or also translationally, the door pivot axis that determines the pivot motion of the maintenance door is preferably oriented parallel to the pitch axis of the machine. Because, for the preferred application instance of a road milling machine, the rotation axis of the milling drum is also oriented parallel to the pitch axis of the machine, the result of the aforesaid preferred orientation of the door pivot axis is that the maintenance door can be conveyed into its maintenance position without causing the maintenance door to cover even a small portion of the working apparatus.

Even if considerable actuation forces become necessary as a result, it is preferred if the actuator is arranged closer to that end region of the maintenance door which is located closer to the door pivot axis. The reason is that the abutment end region is then not disrupted by the actuator, so that a technician or machine operator working close to the abutment end region has a large movement space available without having to worry about colliding with the actuator.

BRIEF DESCRIPTION OF THE DRAWINGS

The present invention will be explained in further detail below with reference to the appended drawings, in which.

DETAILED DESCRIPTION

Figure 1:
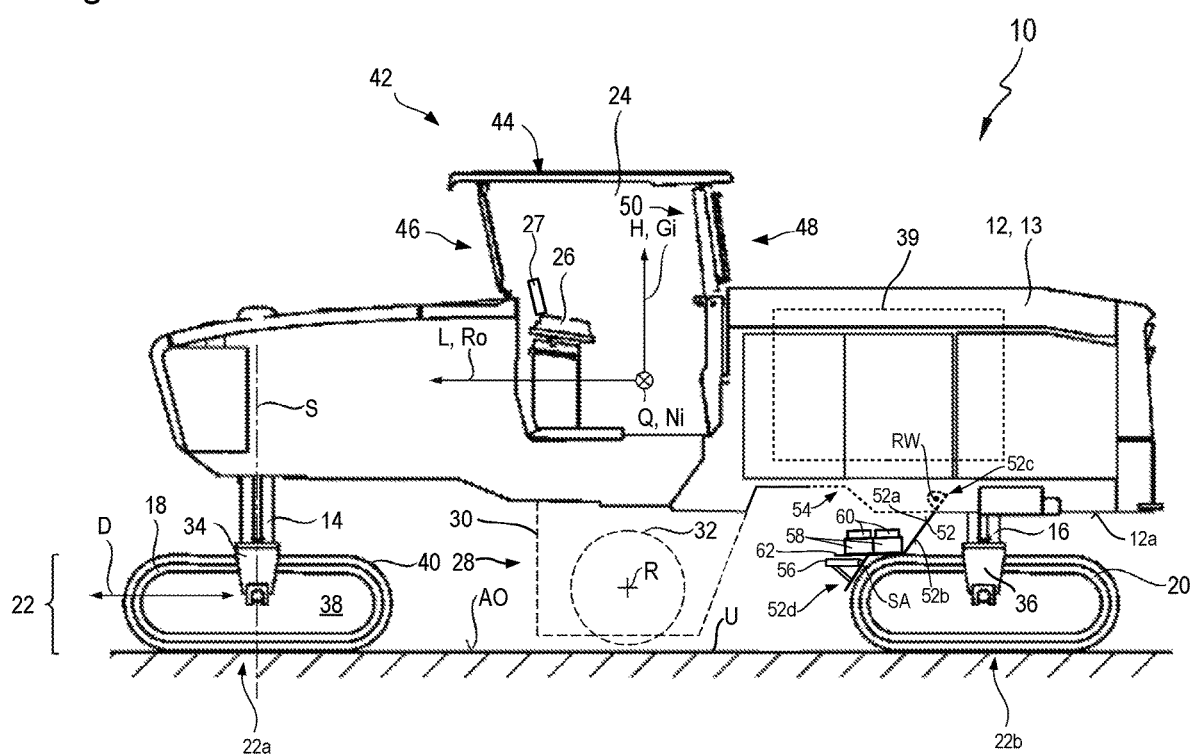
FIG. 1 is a schematic side view of an earth working machine in accordance with an embodiment of the present invention, having a maintenance door in the lowered maintenance position.

In FIG. 1, an embodiment according to the present invention of an earth working machine, in the form of a large earth milling machine or road milling machine, is designated in general as 10. It encompasses a machine frame 12 that constitutes the basic framework for a machine body 13. Machine body 13 encompasses machine frame 12 and components of machine 10 which are connected to machine frame 12 and if applicable are movable relative thereto.

Machine body 13 encompasses front lifting columns 14 and rear lifting columns 16, which are connected at one end to machine frame 12 and at another end respectively to front drive units 18 and to rear drive units 20. The distance of machine frame 12 from drive units 18 and 20 is modifiable using lifting columns 14 and 16.

Drive units 18 and 20 are depicted by way of example as crawler track units. Divergently therefrom, individual or all drive units 18 and/or 20 can also be wheel drive units.

The viewer of FIG. 1 is looking at the earth working machine, or simply "machine," 10 in transverse machine direction Q that is orthogonal to the drawing plane of FIG. 1. A longitudinal machine direction orthogonal to transverse machine direction Q is labeled L, and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to yaw axis Gi of machine 10, longitudinal machine direction L extends parallel to roll axis Ro, and transverse machine direction Q extends parallel to pitch axis Ni.

Earth working machine 10 comprises an operator's platform 24 from which a machine operator can control machine 10 via an operating console 26. Operating console 26 comprises an information interface apparatus 27 in the form of an operating display.

Arranged below machine frame 12 is a working subassembly 28 that here constitutes, by way of example, a milling subassembly 28 having a milling drum 32 that is received in a milling drum housing 30 and is rotatable around a milling axis R extending in transverse machine direction Q, so that substrate material can thereby be removed during earth working, proceeding from supporting surface AO of substrate U, to a milling depth determined by the relative vertical position of machine frame 12. Milling drum 32 is therefore a "working apparatus" as defined in the present application. Alternatively or additionally, milling drum 32 can be received on machine frame 12 vertically adjustably relative thereto.

The vertical adjustability of machine frame 12 by way of lifting columns 14 and 16 also serves to set the milling depth, or generally working depth, of machine 10 during earth working. Earth working machine 10 that is depicted by way of example is a large milling machine for which the arrangement of milling subassembly 28 between front and rear drive units 18 and 20 in longitudinal machine direction L is typical. Large milling machines of this kind, or earth-removing machines in general, can comprise a transport belt for transporting removed earth material away from machine 10. A transport belt that is also present in principle on machine 10 is not depicted in FIG. 1 in the interest of better clarity.

It is not apparent from the side view of FIG. 1 that machine 10 respectively comprises, in both its front end region and its rear end region, two lifting columns 14 and 16 each having a drive unit 18, 20 connected thereto. Front lifting columns 14 are each coupled to drive units 18, in a manner furthermore known per se, by means of a drive unit connecting structure 34, for example a connecting fork that fits over drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction and constitute propelling unit 22 of the machine. Front drive units 18 constitute a front partial propelling unit 22a, and rear drive units 20 constitute a rear partial propelling unit 22b. Drive units 18 and 20 are motor-driven, as a rule by a hydraulic motor (not depicted).

The drive energy source of machine 10 is constituted by an internal combustion engine 39 which is received on machine frame 12 and by which, in the exemplifying embodiment depicted, milling drum 32 is driven to rotate. The output of internal combustion engine 39 furthermore furnishes on machine 10 a hydraulic pressure reservoir with which hydraulic motors and hydraulic actuators on the machine are operable. Internal combustion engine 39 is thus also a source of the energy that propels machine 10.

In the example depicted, drive unit 18, having a running direction indicated by double arrow D, comprises a radially internal receiving and guidance structure 38 on which a recirculatable crawler track 40 is arranged and is guided to move peripherally.

Lifting column 14, and with it drive unit 18, is rotatable by means of a steering apparatus (not depicted in further detail) around a steering axis S. Preferably additionally but also alternatively, lifting column 16, and with it drive unit 20, can be rotatable by means of a steering apparatus around a steering axis parallel to steering axis S.

Operator's platform 24 is covered by a protective canopy structure 42 which encompasses a protective canopy 44 that is connected to machine frame 12 or machine body 13 respectively via a front panel arrangement 46 and a rear partition arrangement 48. Protective canopy 44 is arranged on machine frame 12 liftably and lowerably by means of a movement guidance system 50. Protective canopy 44 is shown in FIG. 1 in its lifted operating position in which machine 10 is ready for working operation.

Machine frame 12 of machine 10 comprises, on its underside 12a facing toward supporting surface AO of substrate U, a maintenance door 52 that is depicted in FIG. 1 in its lowered maintenance position.

In the lowered maintenance position, maintenance door 52 exposes a maintenance opening 54, located below internal combustion engine 39 and indicated with dashed lines in FIG. 1, through which internal combustion engine 39 is accessible from below.

In addition to opening and closing off maintenance opening 54, maintenance door 52 performs a further function in that it comprises on its inner side 52a various functional configurations 56 and 58 that assist maintenance operations on machine 10, more precisely on working apparatus 32. Inner side 52a in this context is that side of maintenance door 52 which faces away from substrate U in the operational readiness position in which the oppositely located outer side 52b of maintenance door 52 is flush with the remainder of underside 12a of machine frame 12. In the operational readiness position, outer side 52b accordingly faces toward substrate U.

A first functional configuration is, by way of example, a foldable maintenance seat 56 that is pivotable, around a seat pivot axis SA parallel to pitch axis Ni, between the use position shown in FIG. 1 in which a technician and/or the machine operator can sit thereon, and a non-use position.

A second functional configuration is a storage compartment 58 in which, by way of example, a bit box 60 having replacement milling bits for milling drum 32 can be received. Advantageously, several storage compartments 58 are provided on inner side 52a of maintenance door 52 so that the largest possible number of replacement milling bits can be furnished there.

To avoid collisions, maintenance seat 56 can be arranged with an offset along pitch axis Ni with respect to storage compartments 58.

In the maintenance position, maintenance door 52 rests with its outer surface 52b, located oppositely from inner side 52a, on a rolling surface of drive unit 20. Further bracing of maintenance door 52 in the maintenance position is therefore not necessary.

At a pivot-mount end region 52c located farther from substrate U in the maintenance position, maintenance door 52 is pivot-mounted on machine frame 12 pivotably around a door pivot axis RW. Door pivot axis RW proceeds parallel to pitch axis Ni. The pivot-mount end region 52c may also be referred to as a mounting end region.

Maintenance door 52 rests on the rolling surface of drive unit 20 in an abutment end region 52d located oppositely from pivot-mount end region 52c. Maintenance flap 52 is embodied in bent fashion in this abutment end region 52d; the bend axes, around which two directly adjacent maintenance door portions are bent relative to one another, preferably each proceed parallel to pitch axis Ni.

Maintenance door 52 is arranged along roll axis Ro between working apparatus 32 and rear partial propelling unit 22b, so that when maintenance door 52 has been lowered into the maintenance position, a technician or machine operator sitting on maintenance seat 56 furnished there can perform maintenance tasks on working apparatus 32 over its entire axial length.

In order to facilitate the reception of storage compartments 58, which must carry considerable weight when they are loaded with bit boxes 60, a carrying configuration 62, for instance in the form of a panel projecting from inner side 52a of maintenance door 52, can be provided on inner side 52a of the maintenance door, which panel enlarges a flat surface, on inner side 52a in the bent region of abutment end region 52d, which receives storage compartments 58.

Figure 2:
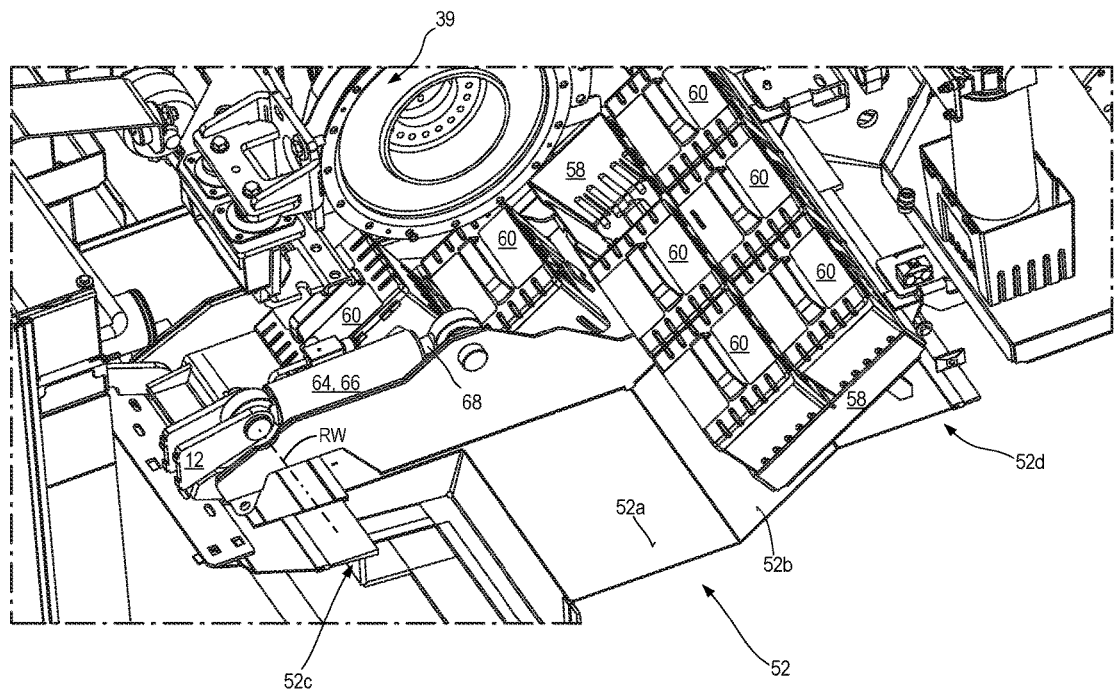
FIG. 2 is a schematic perspective view of the inner side of a maintenance door equipped with storage compartments for bit boxes, now in the operational readiness position.

Maintenance door 52 is shown in FIG. 2 in its raised operational readiness position, looking from an observer's position in the interior of machine body 13. Parts of internal combustion engine 39 located above maintenance door 52 are visible at the top edge of the image, in which it is apparent that a plurality of bit boxes 60 can be furnished on maintenance door 52. Maintenance seat 56 is not depicted in FIG. 2.

As is evident from FIG. 2, maintenance door 52 is displaceable by an actuator 64, for example by a hydraulically or pneumatically actuatable piston-cylinder arrangement, between the lowered maintenance position depicted in FIG. 1 and the raised operational readiness position depicted in FIG. 2. Actuator 64 therefore comprises a cylinder 66 pivot-mounted on machine frame 12, and a piston rod 68 that is movable out of and into cylinder 66 and is pivot-mounted on maintenance door 52.

Surprisingly, actuator 64 is arranged on pivot-mount end region 52c, located closer to door pivot axis RW, of maintenance door 52, where, because of the lever situation existing there, considerably larger displacement forces are needed in order to displace maintenance door 52 than if actuator were provided at the opposite, abutment end region 52d. An actuator 64 provided at abutment end region 52d would, however, in some circumstances be a collision obstacle for a technician or machine operator working in the vicinity of abutment end region 52d. In order to preclude or at least reduce that collision risk and the risk of injury associated therewith, actuator 64 is provided, as depicted, at pivot-mount end region 52c. Actuator 64 is dimensioned so that it alone applies the force necessary for displacing maintenance door 52 between its operating positions.

Figure 3:
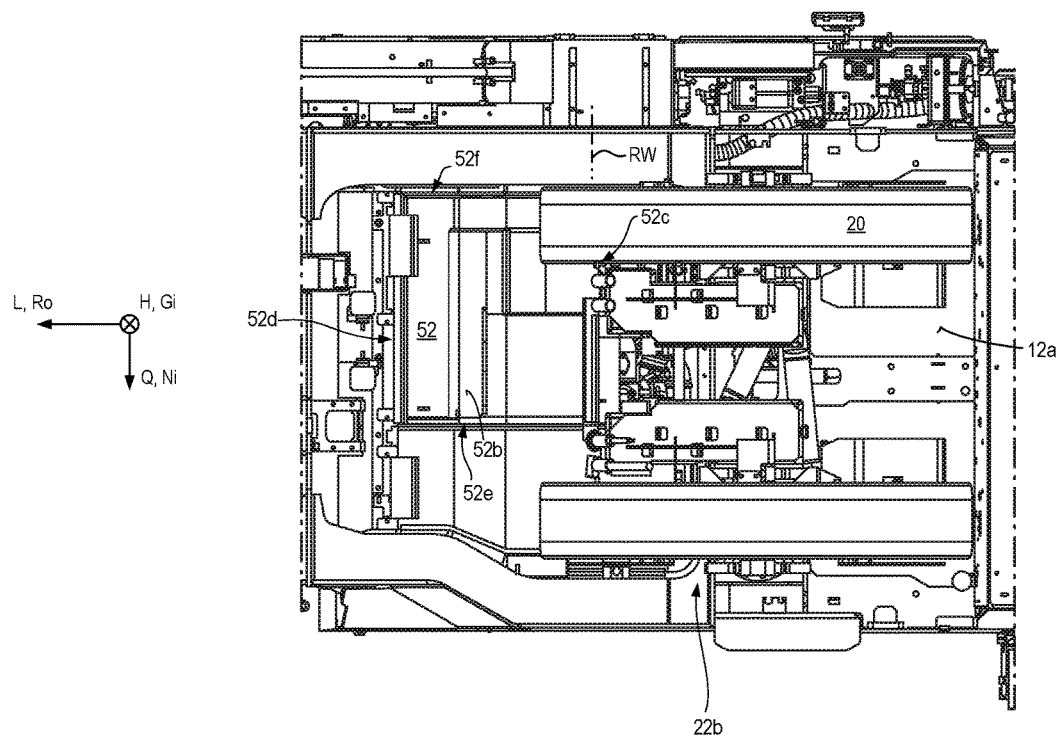
FIG. 3 is a schematic view from below of a rear region, closer to the back of the machine, of the machine of FIG. 1, with the maintenance door in the operational readiness position.

FIG. 3 is a view from below of machine 10 in the region of rear partial propelling unit 22b, maintenance door 52 being in its raised operational readiness position. Maintenance door 52 preferably does not extend along pitch axis Ni as far as one of the lateral edges of machine 10 on either side, but instead maintenance door 52 ends along pitch axis Ni at a distance from each of the lateral edges of machine 10. Lateral edges 52e and 52f are identified in FIG. 3.

The invention claimed is:

1. An earth working machine, comprising:
   a propelling unit;
   a machine frame carried by the propelling unit, the machine frame including an underside facing toward a supporting substrate, the machine frame including a maintenance opening defined in the underside of the machine frame, the maintenance opening being configured to enable access to an internal combustion engine of the earth working machine;
   a milling drum supported from the machine frame for working the supporting substrate, the milling drum being located in a milling drum housing; and
   a maintenance door located on the underside of the machine frame and spaced rearwardly from the milling drum housing, the maintenance door being movable between a raised operational readiness position wherein the maintenance door closes off the maintenance opening and a lowered maintenance position wherein the maintenance opening is open to enable access to the internal combustion engine, the maintenance door including an inner side facing away from the supporting substrate in the operational readiness position, and the maintenance door including on the inner side at least one functional configuration configured to assist a maintenance operation, the at least one functional configuration including a storage compartment for containers for milling bits for the milling drum.

2. The earth working machine of claim 1, wherein:
   the at least one functional configuration includes a maintenance seat for a technician to carry out the maintenance operation.

3. The earth working machine of claim 2, wherein:
   the maintenance seat is displaceable between a non-use position and a use position.

4. The earth working machine of claim 1, wherein:
   the earth working machine includes a front end and a rear end, and a roll axis defined in a longitudinal direction between the front end and the rear end;

the propelling unit includes a front partial propelling unit located closer to the front end than to the rear end, and a rear partial propelling unit located closer to the rear end than to the front end;

the milling drum is arranged along the roll axis between the front partial propelling unit and the rear partial propelling unit; and the maintenance door is located between the rear partial propelling unit and the milling drum housing.

5. The earth working machine of claim 1, further comprising:

an actuator connected between the machine frame and the maintenance door, the actuator being configured to move the maintenance door between the operational readiness position and the maintenance position.

6. The earth working machine of claim 1, wherein:

the maintenance door is pivotable about a door pivot axis between the operational readiness position and the maintenance position.

7. The earth working machine of claim 6, wherein:

the door pivot axis is parallel to a pitch axis of the earth working machine.

8. The earth working machine of claim 1, further comprising:

an actuator connected between the machine frame and the maintenance door, the actuator being configured to move the maintenance door between the operational readiness position and the maintenance position;

wherein the maintenance door includes a mounting end region and an abutment end region, the abutment end region being closer to the supporting substrate than is the mounting end region when the maintenance door is in the maintenance position;

wherein the maintenance door is pivotable about a door pivot axis between the operational readiness position and the maintenance position; and wherein the actuator is connected to the maintenance door closer to the mounting end region than to the abutment end region.

9. An earth working machine, comprising:

a propelling unit;

a machine frame carried by the propelling unit, the machine frame including an underside facing toward a supporting substrate;

a working apparatus supported from the machine frame for working the supporting substrate;

a maintenance door located on the underside of the machine frame, the maintenance door being movable between a raised operational readiness position and a lowered maintenance position, the maintenance door including an inner side facing away from the supporting substrate in the operational readiness position, and the maintenance door including on the inner side at least one functional configuration configured to assist a maintenance operation; and wherein the maintenance door includes a mounting end region and an abutment end region, the abutment end region being closer to the supporting substrate than is the mounting end region when the maintenance door is in the maintenance position, the abutment end region being in abutting engagement with a portion of the propelling unit when the maintenance door is in the maintenance position.

10. The earth working machine of claim 9, wherein:

the propelling unit includes a drive unit including a rolling surface configured to roll on the supporting substrate; and the abutment end region is in abutting engagement with the rolling surface of the drive unit of the propelling unit when the maintenance door is in the maintenance position.

11. The earth working machine of claim 9, wherein:

the abutment end region is bent.

* * * * *